United States Patent [19]

Haldric

[11] Patent Number: 4,505,608
[45] Date of Patent: Mar. 19, 1985

[54] LIGHTENED YOKE FOR A UNIVERSAL JOINT

[75] Inventor: Bernard Haldric, Vendome, France

[73] Assignee: NACAM, Vendome, France

[21] Appl. No.: 484,936

[22] Filed: Apr. 14, 1983

[30] Foreign Application Priority Data

Apr. 15, 1982 [FR] France .............................. 82 06465

[51] Int. Cl.³ ............................................ F16C 11/06
[52] U.S. Cl. ........................................ 403/13; 403/57;
403/157; 72/379; 29/175 A
[58] Field of Search ............... 403/157, 158, 159, 373,
403/13, 14, 57; 72/379; 29/175 A, 175 R

[56] References Cited

U.S. PATENT DOCUMENTS

| 1,553,060 | 9/1925 | Anderson | 29/175 A |
| 1,903,863 | 4/1933 | Hayden | 403/79 |
| 1,994,428 | 3/1935 | Keil | 72/379 X |
| 3,501,928 | 3/1970 | Pitner | 403/285 X |
| 4,334,414 | 6/1982 | Stephan | 403/157 X |
| 4,361,024 | 11/1982 | Haldric | 403/290 X |
| 4,365,909 | 12/1982 | Stephan | 403/157 |

FOREIGN PATENT DOCUMENTS 515714  12/1939  United Kingdom ............... 403/13

Primary Examiner—Andrew V. Kundrat
Attorney, Agent, or Firm—Robert E. Burns; Emmanuel J. Lobato; Bruce L. Adams

[57] ABSTRACT

The yoke formed by the blanking and rolling of a blank comprises branches 1, 2 and a hub 23 which is provided at the end thereof remote from the branches of the yoke with a guiding chamfer for a shaft adapted to receive the yoke. The chamfer 10, 12, 16, 17 is formed by a cold stamping operation.

9 Claims, 9 Drawing Figures

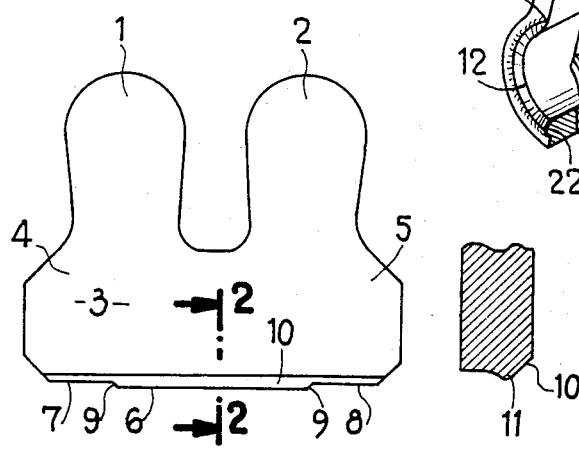
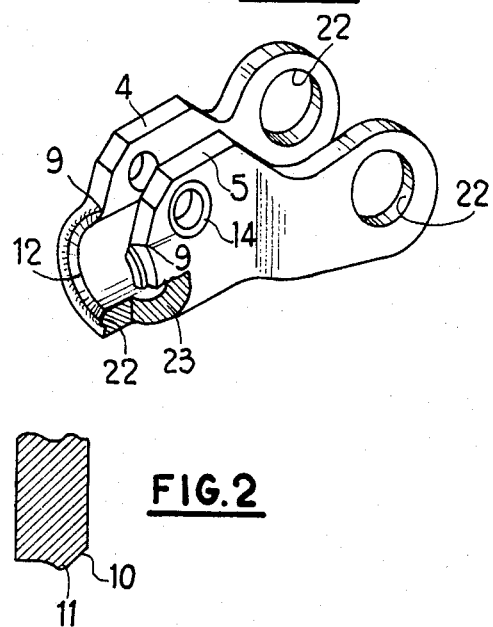
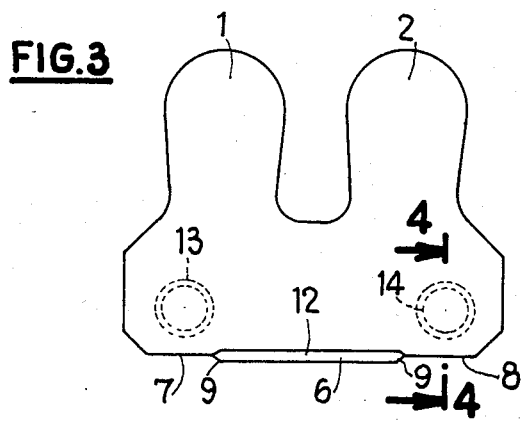
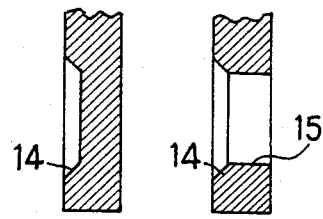
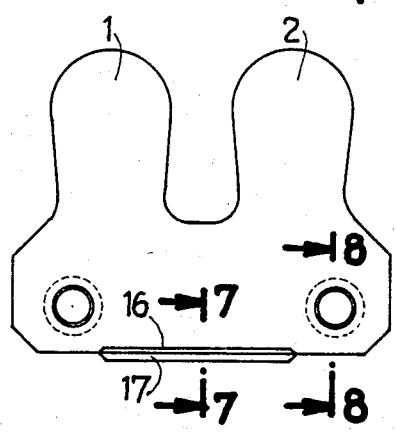
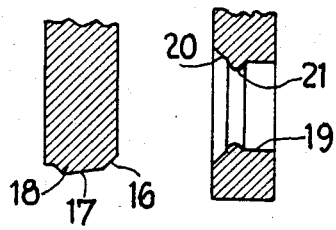

LIGHTENED YOKE FOR A UNIVERSAL JOINT

DESCRIPTION

The present invention relates to universal joints and more particularly to universal joints having a "lightened" yoke made by the rolling or bending of a blank of sheet metal.

The yoke of universal joints of the aforementioned type usually comprise a chamfer on the end of the hub remote from the branches of the yoke for guiding the end of the shaft on which the hub must be mounted.

At least one of the bolt apertures formed in the tabs of the clamping means of the hub also has a chamfer for facilitating the placing in position of the bolt for clamping the hub on its shaft.

These chamfers are produced by removing material and this requires for producing the yoke two additional machining operations which are added to the indispensible machining operations for forming the bores in the branches of the yoke, for forming the bolt apertures and for forming the splines in the hub.

An object of the invention is to provide a lightened yoke of a universal joint in which machining operations removing material are reduced to a minimum.

The invention therefore provides a coupling element, and in particular a lightened yoke for a universal joint, formed by a blank of sheet metal rolled to comprise an axially extending hub having on an end edge two inner axially adjoining chamfers which are the result of a simultaneous cold stamping, operation an axially outer chamfer of said two chamfers having a given taper and constituting a reference surface for subsequent machining and assembling operations and an axially inner chamfer of said two chamfers having a taper less than said given taper and facilitating the penetration of a broach for machining the splines in the hub.

Further features of the invention will be apparent from the ensuing description with reference to the accompanying drawings which are given solely by way of example and in which:

FIG. 1 is a plan view of a blank of a yoke of a universal joint on which blank a chamfer of the hub has been formed before rolling the blank;

FIG. 2 is a sectional view taken along line 2—2 of FIG. 1;

FIG. 3 is a view similar to FIG. 1 of another embodiment of the chamfer of the hub before rolling;

FIG. 4 is a sectional view taken along line 4—4 of FIG. 3 of a way of forming a bolt aperture chamfer before punching this aperture;

FIG. 5 is a view corresponding to FIG. 4 of the punched bolt aperture;

FIG. 6 is a plan view of a blank of a yoke of a universal joint before rolling, on which blank a double hub chamfer has been formed;

FIG. 7 is a sectional view taken along line 7—7 of FIG. 6;

FIG. 8 is a sectional view taken along line 8—8 of FIG. 6, and

FIG. 9 is a perspective view, with a part cut away, of a universal joint yoke having chamfers formed by a cold stamping operation according to the invention.

FIG. 1 shows a blank of a universal joint formed by a blanking from metal sheet and having branches 1 and 2 which are the branches of the yoke, of the universal joint and are interconnected by a portion 3 which, after the blank, has been rolled or bent constitutes the hub of the yoke.

The ends 4 and 5 of the portion 3 form tabs of the clamping means of the hub.

In the embodiment shown in FIG. 1, the side of the portion 3 of the hub opposed to the branches 1 and 2 is cut out in such manner as to have a central zone 6 and two lateral zones 7 and 8 which are connected to the central zone by steps 9. The length of the central zone 6 is substantially equal to that of the cylindrical portion of the hub and the length of the zones 7 and 8 is substantially equal to the length of the tabs of the clamping means of the hub. The steps 9 are formed in the zones of the bending of the tabs relative to the cylindrical portion of the hub. The contour which has just been described is formed by the blanking of the blank from the metal sheet.

In the embodiment shown in FIG. 1, a chamfer 10 extending throughout the length of the edge of the hub portion 3 of the blank is formed by a cold stamping operation. It can be seen that the width of the chamfer 10 in the central zone 6 exceeds its width in the lateral zones 7 and 8. The presence of the steps 9 permits, when rolling the blank to form the yoke, avoiding the formation in the region of the connection between the cylindrical portion of the hub and the tabs of the clamping means of the latter, beads which tend to increase the axial overall size of the yoke.

FIG. 2 shows the appearance of the chamfer 10 formed in the central zone 6 of the blank of FIG. 1. It will be observed in FIG. 2 that the forming of the chamfer 10 gives rise to a bead 11 in a part of the edge of the sheet metal of the blank.

FIG. 3 shows a blank similar to that of FIG. 1 which comprises, as the preceeding blank, a side remote from the branches 1 and 2 of the yoke comprising a central zone 6 and two lateral zones 7 and 8 connected to the central zone by steps 9. This side, which forms the edge of the inner rear surface of the yoke, comprises a chamfer 12 which is formed, as the chamfer 10, by a cold stamping operation but which extends only along the length of the central zone 6 which forms the hub proper. Such an arrangement enables the stamping force for forming the chamfer and the resulting deformation to be reduced.

Further, FIG. 3 shows the line of the chamfers 13 and 14 for the bolt apertures produced by a flat stamping operation on the blank as shown in FIG. 4. FIG. 4 shows that the chamfers 13 and 14 may be formed before punching the bolt apertures so that the latter may be thereafter formed either on the blank or on the finished yoke. The bolt apertures, such as the aperture 15, obtained in this way are smooth apertures.

FIG. 6 is a view similar to FIGS. 1 and 3. The blank shown in FIG. 6 has on its rear edge remote from the branches 1 and 2 of the yoke, two chamfers 16, 17 formed, as in the preceding cases, by a cold stamping operation in the hub zone of said edge. These two chamfers are formed simultaneously, the outer chamfer 17 constituting a surface which may be used as a reference surface for, the machining or assembling operations or both machining and assembling operations carried out on the yoke. The contour of the chamfered zone of the blank shown in FIG. 6 is shown in FIG. 7 in which can be seen the bead 18 resulting from the forming of the chamfers 16 and 17 and occupying a larger part of the edge than in the case of FIG. 2. Further, it can be seen that the taper of the inner chamfer 16 is greater than that of the outer chamfer 17.

In the embodiment of FIG. 6, it is arranged to form the chamfers of the bolt apertures 19 after the latter have been punched. FIG. 8 shows that the forming of the chamfer 20 results in the forming of an inner peripheral bead 21 in the corresponding bolt aperture 19. Of course, the chamfers 20 are also formed by a cold stamping operation on the blank shown in FIG. 6 before the latter has been rolled.

FIG. 9 shows in perspective a universal joint yoke provided with bores 22 for the trunnions of the spider element, this yoke being produced by rolling the blank of FIG. 3 with the chamfer 12 of the hub and the chamfer 14 of the bolt aperture obtained by a cold stamping operation.

In this figure, there can be seen the peripheral bead 22 resulting from the forming of the hub chamfer 12 and the line of the steps 9 in the region of the junctions between the cylindrical part of the hub 23 and the tabs 4 and 5 of the clamp of the hub.

In order to finish the yoke, there remains the machining of the bores 22 and the broaching of the splines in the hub 23.

Thus it can be seen that the provision of chamfers by a cold stamping operation enables the number of machining operations removing material to be reduced to a minimum.

In the various embodiments just described, the chamfers are formed by a cold stamping operation carried out on the blank before the latter has been rolled. The chamfers of the hub and the bolt apertures may also be formed by a cold stamping operation on the yoke in the as-rolled state of the blank.

Although the invention just described is applied to a yoke for a universal joint, it can also be used for a coupling element of different type, for example a coupling element having a split hub of the type described before connected to at least one fixing tab located in a plane substantially perpendicular to the axis of said hub.

Having now described my invention what I claim as new and desire to secure by Letters Patent is:

1. A coupling element, and in particular a lightened yoke for a universal joint, made from a blank which has been blanked from a sheet of metal and rolled so as to comprise an axially extending hub having on an end edge of the hub two inner axially adjoining chamfers which are the result of a simultaneous cold stamping operation, an axially outer chamfer of said two chamfers having a given taper and constituting a reference surface for machining and assembling operations subsequently carried out on the coupling element and an axially inner chamfer of said two chamfers having a taper less than said given taper and facilitating the penetration of a broach for machining splines in the hub.

2. A coupling element according to claim 1, wherein said chamfers are the result of their formation on the blank before the rolling of the blank.

3. A coupling element according to claim 1, wherein said chamfers are the result of their formation on the coupling element after rolling the blank.

4. A coupling element according to claim 2, wherein said chamfers are also formed on end edges of tabs extending from the hub and constituting clamping means.

5. A coupling element according to claim 1, wherein the hub has a clamping means which comprises tabs which extend from the hub and define apertures for the passage of a bolt for urging the tabs toward each other and tightening the hub on a shaft receiving the coupling element, at least one of said bolt apertures being provided with a chamfer which is the result of a cold stamping operation.

6. A coupling element according to claim 5, wherein the chamfer of the bolt aperture is the result of the formation of the chamfer on the blank before the rolling of the blank and before the provision of the corresponding bolt aperture.

7. A coupling element according to claim 5, wherein said chamfer of the bolt aperture is the result of the formation of the chamfer on the blank before the rolling of the blank and after the provision of the bolt aperture.

8. A coupling element according to claim 5, wherein said chamfer of the bolt aperture is the result of the formation of the chamfer on the coupling element after the rolling of the blank and before the provision of the corresponding bolt aperture.

9. A coupling element according to claim 5, wherein said chamfer of the bolt aperture is the result of the formation of the chamfer on the coupling element after the rolling of the blank and after the provision of the corresponding bolt aperture.

* * * * *